United States Patent
Kobayashi et al.

(10) Patent No.: US 6,863,640 B2
(45) Date of Patent: Mar. 8, 2005

(54) CONTROL APPARATUS AND CONTROL METHOD FOR AUTOMATIC TRANSMISSION

(75) Inventors: Kiyoshi Kobayashi, Toyota (JP); Yoji Takanami, Anjo (JP); Yasushi Kobiki, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 35 days.

(21) Appl. No.: 10/384,588

(22) Filed: Mar. 11, 2003

(65) Prior Publication Data

US 2003/0186783 A1 Oct. 2, 2003

(30) Foreign Application Priority Data

Mar. 29, 2002 (JP) ......................... 2002-093959

(51) Int. Cl.[7] .............................. F16H 61/26
(52) U.S. Cl. ............... 477/156; 477/902; 477/115; 477/160; 477/161; 475/121; 475/127; 701/58; 701/59
(58) Field of Search ................. 477/902, 115, 477/161, 160, 156; 475/121, 127; 701/58, 59

(56) References Cited

U.S. PATENT DOCUMENTS

| | | | | |
|---|---|---|---|---|
| 5,643,135 A | * | 7/1997 | Tabata et al. | 477/154 |
| 5,879,268 A | * | 3/1999 | Yasue et al. | 477/143 |
| 5,882,276 A | * | 3/1999 | Usuki et al. | 477/120 |
| 5,957,800 A | * | 9/1999 | Oba et al. | 475/119 |
| 6,514,175 B2 | * | 2/2003 | Taniguchi et al. | 477/156 |

FOREIGN PATENT DOCUMENTS

| | | |
|---|---|---|
| JP | 5-052257 | 3/1993 |
| JP | 5-180323 | 7/1993 |
| JP | 7-286662 | 10/1995 |
| JP | 8-285064 | 11/1996 |
| JP | 10-196778 | 7/1998 |
| JP | 2000-205398 | 7/2000 |
| JP | 2001-21030 | 1/2001 |

* cited by examiner

Primary Examiner—Rodney H. Bonck
Assistant Examiner—David D. Le
(74) Attorney, Agent, or Firm—Oblon, Spivak, McClelland, Maier & Neustadt, P.C.

(57) ABSTRACT

An ECT-ECU includes an abrupt turbine speed increase learning control circuit which prevents simultaneous release of both a frictional engagement element to be released and a frictional engagement element to be engaged, a tie-up learning control circuit which prevents simultaneous engagement of both the frictional engagement element to be released and the frictional engagement element to be engaged, a determination circuit that determines whether one of tie-up learning control and abrupt turbine speed increase learning control is necessary based on the turbine speed, and a control circuit that prohibits execution of the tie-up learning control unless the number of trips after the abrupt turbine speed increase learning control has been executed is at least equal to a predetermined number, when it has been determined that the tie-up learning control is necessary.

16 Claims, 8 Drawing Sheets

FIG. 2

| | C-1 | C-2 | C-3 | B-1 | B-2 | B-3 | B-4 | F-1 | F-2 | F-3 |
|---|---|---|---|---|---|---|---|---|---|---|
| P | | | | | | | | | | |
| REV | | | O | | | | O | O | | |
| N | | | | (O) | | | | | | |
| 1ST | O | | | | | | (O) | | | O |
| 2ND | O | | | | (O) | (O) | | | O | |
| 3RD | O | | O | (O) | | O | | O | | |
| 4TH | O | O | ● | | | ● | | | | |
| 5TH | | O | O | O | | ● | | | | |

● : ENGAGED BUT NO TORQUE IS TRANSMITTED
O : ENGAGED ONLY WHEN ENGINE BRAKE IS APPLIED

CONTROL APPARATUS AND CONTROL METHOD FOR AUTOMATIC TRANSMISSION

The disclosure of Japanese Patent Application No. 2002-093959 filed on Mar. 29, 2002, including its specification, drawings and abstract, is incorporated herein by reference in its entirety.

BACKGROUND OF THE INVENTION

1. Field of the Invention

The invention relates to a control apparatus for an automatic transmission mounted in a vehicle. More particularly, the invention relates to a control apparatus that controls clutch-to-clutch shifting.

2. Description of the Related Art

An automatic transmission mounted in a vehicle is formed of a combination of a torque converter to which output from an engine is input and a speed change gear mechanism driven by the output of the torque converter. The power transfer path in this speed change gear mechanism can be changed by selectively applying and releasing a plurality of frictional engagement elements such as clutches and brakes, to automatically shift the transmission to a predetermined speed according to the desire of the driver or the running state. In this type of automatic transmission, a frictional engagement element for engine braking can also be used in addition to a frictional engagement element for shifting. This frictional engagement element for engine braking usually transmits power only during driving, and activates the engine brake during low speed running when in gear stages of the first or second ranges or the like by engaging at a predetermined gear stage in those ranges.

In this kind of automatic transmission, there may be a shift by switching the frictional engagement element that is applied, in which control that engages and control that releases different frictional engagement elements are executed simultaneously (i.e., a so-called "clutch-to-clutch shift"). With this type of clutch-to-clutch shift, the timing of the engagement and release of the clutches is able to be balanced, which is a preferable shifting characteristic (e.g., the driver feels a smooth shift).

In clutch-to-clutch shifting, when the clutch to be released is released too early or when the clutch to be engaged is applied too late, a situation occurs in which neither of the clutches are sufficiently engaged, and a phenomenon in which the speed of the turbine, which is the speed on the input side of the automatic transmission, increases abruptly results (hereinafter, referred to as "abrupt turbine speed increase"). When this occurs, a smooth shift feel is no longer able to be achieved so abrupt turbine speed increase learning control is executed which delays hydraulic pressure control of the clutch to be released or speeds up hydraulic pressure control of the clutch to be engaged accordingly.

On the other hand, when the clutch to be released is released too late or when the clutch to be engaged is applied too early, a situation occurs in which frictional engagement elements of different gear stages are applied at the same time, and a phenomenon in which shift shock (so-called "tie-up shock") results due to the difference in the rotation speeds of the frictional engagement elements. When this occurs, a smooth shift feel is no longer able to be achieved so tie-up learning control is executed which speeds up hydraulic pressure control of the clutch to be released or delays hydraulic pressure control of the clutch to be engaged accordingly.

However, the foregoing abrupt turbine speed increase learning control and the tie-up learning control control the hydraulic pressure control in opposite directions. That is, with respect to the hydraulic pressure control of the clutch to be released, the abrupt turbine speed increase learning control is performed to delay that hydraulic pressure control and the tie-up learning control is performed to speed up that hydraulic pressure control. Even after the abrupt turbine speed increase learning control has been performed, if the tie-up learning control continues, there is a possibility that the control of the hydraulic pressure circuit of the clutch to be released, which is the object of control, will begin hunting. This is illustrated in FIG. 8.

Figure 8:
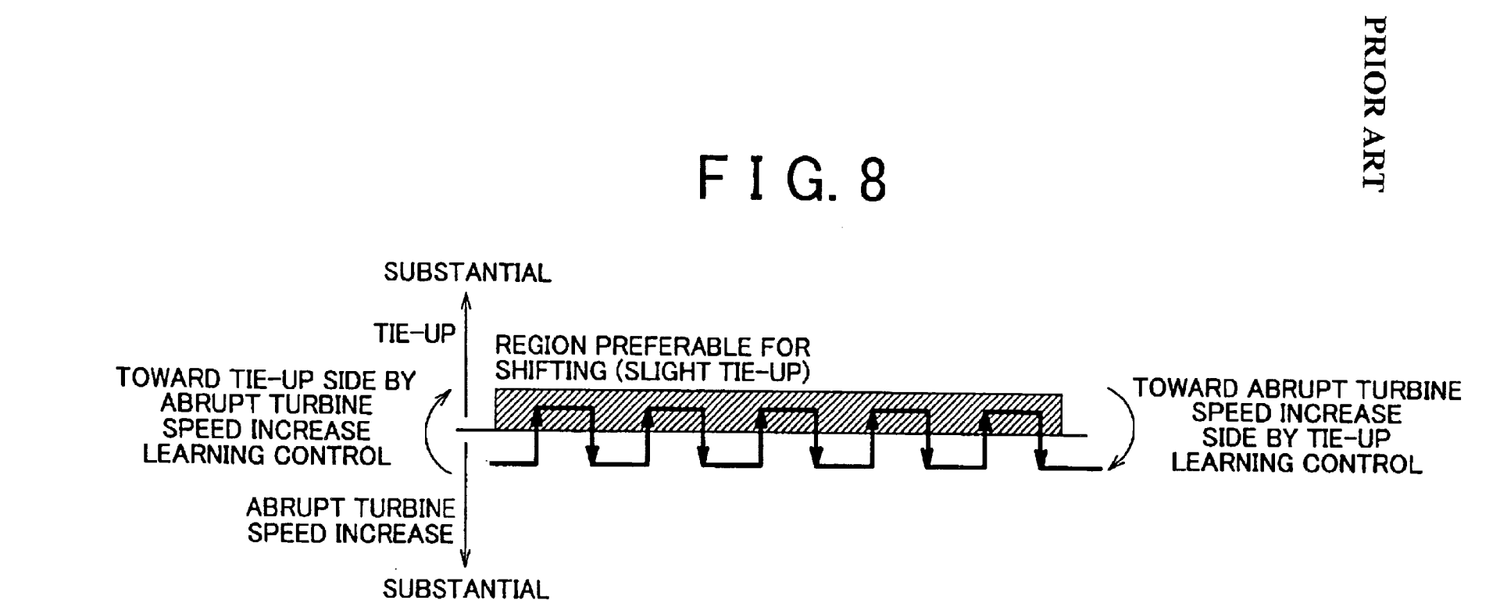
FIG. 8 is a second diagram illustrating a state in which the tie-up learning control and the abrupt turbine speed increase learning control are repeatedly executed.

As shown in FIG. 8, it is determined whether the transmission is in the abrupt turbine speed increase state or the tie-up state. When the transmission state is on the abrupt turbine speed increase side, the abrupt turbine speed increase learning control is executed to delay the hydraulic pressure control of the clutch to be released or speed up the hydraulic pressure control of the clutch to be engaged appropriately. As a result, the transmission state will be on the tie-up side after the next clutch-to-clutch shift. At this time, the learning control performed brings the transmission state into a region of slight tie-up, which is a region preferable for shifting.

Because it is difficult to detect when the transmission is in this slight tie-up state, it may be determined that the transmission in this state is simply on the tie-up side, and the tie-up learning control may be executed as a result, thereby speeding up the hydraulic pressure control of the clutch to be released or delaying the hydraulic pressure control of the clutch to be engaged. As a result, the transmission state will be back on the abrupt turbine speed increase side after the next clutch-to-clutch shift. Repeatedly executing learning controls that lead to these kinds of opposite results, results in a control state of hunting. When hunting occurs, a smooth shift feel is unable to be achieved.

SUMMARY OF THE INVENTION

An object of the invention is to provide a control apparatus and control method for an automatic transmission in which a smooth shift feel can be achieved during a clutch-to-clutch shift.

A control apparatus according to a first aspect of the invention controls an automatic transmission that executes a shift by simultaneously controlling release and engagement of different frictional engagement elements. This control apparatus includes first hydraulic pressure learning controlling means for executing a first learning control to change a hydraulic pressure control of at least one of a frictional engagement element to be released and a frictional engagement element to be engaged so as to avoid a situation in which both of the frictional engagement elements are in a state of release at the same time; second hydraulic pressure learning controlling means for executing a second learning control to change the hydraulic pressure control of at least one of the frictional engagement element to be released and the frictional engagement element to be engaged so as to avoid a situation in which both of the frictional engagement elements are in a state of engagement at the same time; detecting means for detecting a turbine speed; determining means for determining whether one of the first learning control and the second learning control should be executed based on the detected turbine speed; storing means for storing a history of execution of at least one of the learning controls; and controlling means for controlling the first hydraulic pressure learning controlling means and the second hydraulic pressure learning controlling means such that the learning control determined by the determining means is executed when the history stored in the storing means fulfills a predetermined condition.

According to this first aspect of the invention, the first hydraulic pressure learning controlling means executes an abrupt turbine speed increase learning control to shift the transmission toward the tie-up side by executing a first learning control to change a hydraulic pressure control of the frictional engagement element so as to avoid a situation in which the transmission is in the abrupt turbine speed increase state, for example. The second hydraulic pressure learning controlling means executes tie-up learning control to shift the transmission to the abrupt turbine speed increase side by executing a second learning control to change the hydraulic pressure control of the frictional engagement element so as to avoid a situation in which the transmission is in the tie-up state, for example. In the storing means is stored a history of the abrupt turbine speed increase learning control and the tie-up learning control that have been executed. The controlling means will not execute the tie-up control unless a predetermined condition relating to the history of the executed abrupt turbine speed increase learning control (e.g., unless a condition in which a number of trips of an ignition switch being turned from on to off is equal to, or greater than, a predetermined number after the abrupt turbine speed increase learning control has been executed) is fulfilled, even if it has been determined that the tie-up learning control should be executed. On the other hand, for example, when the number of trips after the abrupt turbine speed increase learning control has been executed is equal to, or greater than, the predetermined number, there is an undeniable possibility that the transmission state may be in a region of substantial tie-up due to a control characteristic variation or the like while the vehicle is running, even if the transmission state was temporarily in a region of slight tie-up from the abrupt turbine speed increase learning control. Therefore, the tie-up learning control is executed. As a result, it is possible to provide a control apparatus for an automatic transmission in which a smooth shift feel can be achieved during a clutch-to-clutch shift without hunting occurring, even when both the abrupt turbine speed increase control and tie-up control are used, for example.

The determining means in the first aspect of the invention can include means for determining whether one of the first learning control and the second learning control should be executed based on a change over time in the detected turbine speed. Accordingly, it can be determined whether the transmission state is on the tie-up side or on the abrupt turbine speed increase side based on the change over time of the turbine speed.

The first aspect of the invention can further include means for detecting an engine speed. The determining means can include means for determining whether one of the first learning control and the second learning control should be executed based on the detected turbine speed and engine speed. Accordingly, when a slip amount or slip rate, which is calculated from the engine speed and the turbine speed, is greater than a predetermined value, it is determined, based on that slip amount or slip rate, that the transmission is the abrupt turbine speed increase state so the tie-up learning control, for example, as the second learning controlling means is executed. When the slip amount or the slip rate is equal to, or less than, the predetermined value, it is determined that the transmission is in the tie-up state so the tie-up learning control, for example, as the first learning controlling means is executed.

In the foregoing aspect, and the variations thereof, of the invention, the first hydraulic pressure learning controlling means can include means for executing one of a learning control to delay the hydraulic pressure control of the frictional engagement element to be released and a learning control to speed up the hydraulic pressure control of the frictional engagement element to be engaged. Also, the second hydraulic pressure learning controlling means can include means for executing one of a learning control to speed up the hydraulic pressure control of the frictional engagement element to be released and a learning control to delay the hydraulic pressure control of the frictional engagement element to be engaged. Accordingly, the first hydraulic pressure learning controlling means executes the abrupt turbine speed increase learning control to shift the transmission from the abrupt turbine speed increase state toward the tie-up side by executing at least one of the learning control to delay the hydraulic pressure control of the frictional engagement element to be released and the learning control to speed up the hydraulic pressure control of the frictional engagement element to be engaged. The second hydraulic pressure learning controlling means executes the tie-up learning control to shift the transmission from the tie-up state toward the abrupt turbine speed increase side by executing at least one of the learning control to speed up the hydraulic pressure control of the frictional engagement element to be released and the learning control to delay the hydraulic pressure control of the frictional engagement element to be engaged.

The controlling means in the foregoing aspect, and the variations thereof, of the invention can include means for controlling the second hydraulic pressure learning controlling means to execute the second learning control when the number of trips of an ignition switch being turned from on to off is equal to, or greater than, a predetermined number of times after the latest execution of the first learning control, and the determining means determines that the second learning control should be executed. Accordingly, for example, when the number of trips of the ignition switch being turned from on to off becomes equal to, or greater than, the predetermined number after the latest execution of the abrupt turbine speed increase learning control, for example, as the first learning control, there is an undeniable possibility that the transmission state may be in the region of substantial tie-up, so the tie-up learning control, for example, as the second learning control is executed in order to shift the transmission state toward the abrupt turbine speed increase side so that the transmission does not become in the tie-up state. As a result, when the transmission state is in the region of slight tie-up, which is a preferable state for shifting, the tie-up learning control is not performed, but when the transmission is in the region of substantial tie-up, which is not a preferable state for shifting, the tie-up learning control is performed, thereby making the shift feel smooth.

A control method according to a second aspect of the invention executes a shift by simultaneously controlling release and engagement of different frictional engagement elements. This control method includes a first hydraulic pressure learning control step of executing a first learning control to change a hydraulic pressure control of at least one of a frictional engagement element to be released and a frictional engagement element to be engaged so as to avoid a situation in which both of the frictional engagement elements are in a state of release at the same time; a second hydraulic pressure learning control step of executing a second learning control to change the hydraulic pressure control of at least one of the frictional engagement element to be released and the frictional engagement element to be engaged so as to avoid a situation in which both of the frictional engagement elements are in a state of engagement at the same time; a detection step of detecting a turbine speed; a determination step of determining whether one of the first learning controlling and the second learning control should be executed based on the detected turbine speed; a storage step of storing a history of execution of at least one of the learning controls; and a control step of controlling the first hydraulic pressure learning controlling means and the second hydraulic pressure learning controlling means such that the learning control determined in the determination step is executed when the stored history fulfills a predetermined condition.

According to the second aspect of the invention, the first hydraulic pressure learning control step executes an abrupt turbine speed increase learning control to shift the transmission toward the tie-up side by executing a first learning control to change the hydraulic pressure control of the frictional engagement element so as to avoid a situation in which the transmission is in the abrupt turbine speed increase state, for example. The second hydraulic pressure learning control step executes a tie-up learning control to shift the transmission toward the abrupt turbine speed increase side by executing a second learning control to change the hydraulic control of the frictional engagement element so as to avoid a situation in which the transmission is in the tie-up state, for example. In the storage step, a history of the executed abrupt turbine speed increase learning control and tie-up learning control is stored. The control step will not execute the tie-up control unless a predetermined condition relating to the history of the executed abrupt turbine speed increase learning control (e.g., unless a condition in which a number of trips of an ignition switch being turned from on to off is equal to, or greater than, a predetermined number after the abrupt turbine speed increase learning control has been executed) is fulfilled, even if it is determined that the tie-up learning control should be executed. On the other hand, for example, when the number of trips after the abrupt turbine speed increase learning control has been executed is equal to, or greater than, the predetermined number, there is an undeniable possibility that the transmission state may be in the region of substantial tie-up due to a control characteristic variation or the like while the vehicle is running, even if the transmission state was temporarily in the region of slight tie-up from the abrupt turbine speed increase learning control. Therefore, the tie-up learning control is executed. As a result, it is possible to provide a control apparatus for an automatic transmission in which a smooth shift feel can be achieved during a clutch-to-clutch shift without hunting occurring, even when both the abrupt turbine speed increase control and tie-up control are used, for example.

The determination step in the second aspect of the invention can include a step of determining whether one of the first learning control and the second learning control should be executed based on a change over time in the detected turbine speed. Accordingly, it can be determined based on the change over time in the turbine speed whether the transmission state is on the tie-up side or on the abrupt turbine speed increase side.

The second aspect of the invention can further include a step of detecting an engine speed. The determination step can include a step of determining whether one of the first learning control and the second learning control should be executed based on the detected turbine speed and engine speed. Accordingly, the transmission is determined to be in the abrupt turbine speed increase state when a slip amount or slip rate, which is calculated from the engine speed and the turbine speed, is greater than a predetermined value based on that slip amount or slip rate, so the tie-up learning control, for example, is executed as the second learning control step. When the slip amount or the slip rate is equal to, or less than, the predetermined value, the transmission is determined to be in the tie-up state, so the abrupt turbine speed increase learning control, for example, is executed as the first learning control step.

In the foregoing aspect, and the variations thereof, of the invention, the first hydraulic pressure learning control step can include a step of executing one of a learning control to delay the hydraulic pressure control of the frictional engagement element to be released and a learning control to speed up the hydraulic pressure control of the frictional engagement element to be engaged. Further, the second hydraulic pressure learning control step can include a step of executing one of a learning control to speed up the hydraulic pressure control of the frictional engagement element to be released and a learning control to delay the hydraulic pressure control of the frictional engagement element to be engaged. Accordingly, in the first hydraulic pressure learning control step, the abrupt turbine speed increase learning control is executed to shift the transmission from the abrupt turbine speed increase state toward the tie-up side by executing at least one of the learning control to delay the hydraulic pressure control of the frictional engagement element to be released and the learning control to speed up the hydraulic pressure control of the frictional engagement element to be engaged. In the second hydraulic pressure learning control step, the tie-up learning control is executed to shift the transmission from the tie-up state toward the abrupt turbine speed increase side by executing at least one of the learning control to speed up the hydraulic pressure control of the frictional engagement element to be released and the learning control to delay the hydraulic pressure control of the frictional engagement element to be engaged.

In the foregoing aspect, and the variations thereof, of the invention, the control step can include a step of controlling the second hydraulic pressure learning controlling means to execute the second learning control when the number of trips of an ignition switch being turned from on to off is equal to, or greater than, a predetermined number of times after the latest execution of the first learning control, and the it is determined in the determination step that the second learning control should be executed. Accordingly, when the number of trips of the ignition switch being turned from on to off is equal to, or greater than, the predetermined number of times after the latest execution of the abrupt turbine speed increase learning means, for example, as the first learning means, there is an undeniable possibility that the transmission state is in the region of substantial tie-up, so the tie-up learning control, for example, is executed as the second learning control in order to shift the transmission state toward the abrupt turbine speed increase side so that the transmission does not become in the tie-up state. As a result, when the transmission state is in the region of slight tie-up, which is a preferable region for shifting, the tie-up learning control is not performed, but when the transmission is in the region of substantial tie-up, which is not a preferable region for shifting, the tie-up learning control is performed, thereby making the shift feel smooth.

A control apparatus according to a third aspect of the invention, comprises a frictional engagement element to be released, a frictional engagement element to be engaged, a detector that detects a turbine speed, and a controller. The controller executes a first learning control to change a hydraulic pressure control of at least one of the frictional engagement element to be released and the frictional engagement element to be engaged so as to avoid a situation in which both of the frictional engagement elements are in a state of release at the same time, and a second learning control to change the hydraulic pressure control of at least one of the frictional engagement element to be released and the frictional engagement element to be engaged so as to avoid a situation in which both of the frictional engagement elements are in a state of engagement at the same time. The controller determines whether one of the first learning control and the second learning control should be executed based on the detected turbine speed, stores a history of execution of at least one of the learning controls, and controls the first hydraulic pressure learning control and the second hydraulic pressure learning control such that the learning control determined by the determination is executed when the history stored in the storing means fulfills a predetermined condition.

DETAILED DESCRIPTION OF THE PREFERRED EMBODIMENTS

Hereinafter, embodiments of the invention will be described with reference to the drawings. In the descriptions, like parts will be denoted by like reference numerals. The nomenclature and function of the like parts are also the same so detailed explanations will not be repeated. It should also be noted that this invention can be applied to either an upshift or a downshift.

Figure 1:
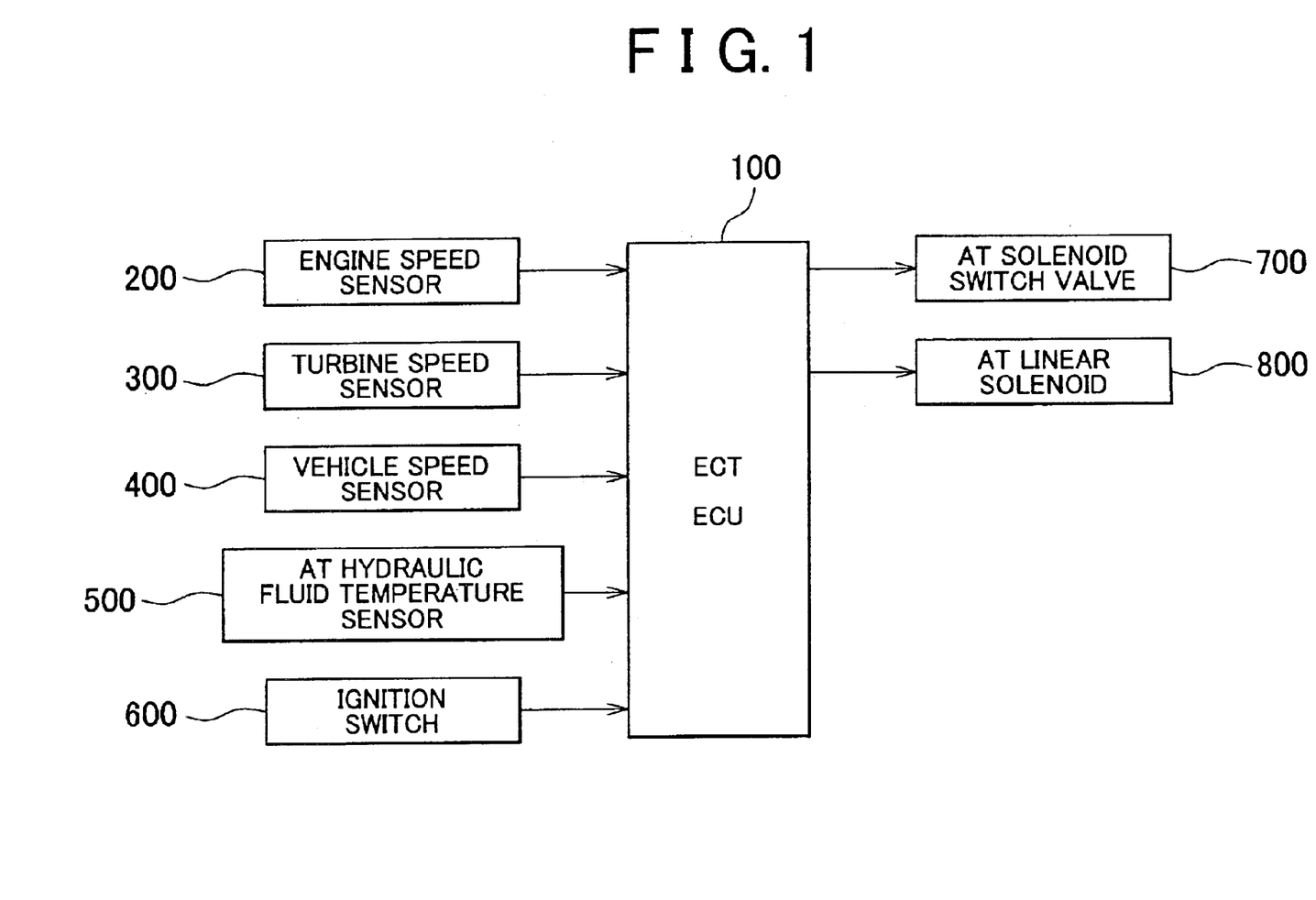
FIG. 1 is a block diagram showing a control system that includes a control apparatus for an automatic transmission according to one embodiment of the invention.

FIG. 1 is a block diagram showing the control of an automatic shifting system that includes an ECT-ECU (Electronically Controlled Automatic Transmission-Electronic Control Unit) 100 for realizing the control apparatus of an automatic transmission according to one embodiment of the invention. The ECT-ECU 100 of this system is a controller that controls the automatic transmission. The ECT-ECU 100 includes programs, memory that stores various data, a CPU (Central Processing Unit) that executes the programs stored in the memory, a clock that generates a basic operation frequency, and a timer that measures elapsed time, and the like.

Various signal wires are connected to the ECT-ECU 100, such as those from an engine speed sensor 200 that detects an engine speed, a turbine speed sensor 300 that detects an output speed (equivalent to the AT input shaft rotation speed) of a torque converter of the automatic transmission, an AT hydraulic fluid temperature sensor 500 that detects a temperature of a hydraulic fluid of the automatic transmission, and an ignition switch 600 for starting an engine. Output signal wires from the ECT-ECU 100 are connected to an AT solenoid switching valve 700 and an AT linear solenoid 800. When a shift command signal is output from the ECT-ECU 100 to the AT solenoid switching valve 700 and the AT linear solenoid 800, a shift is performed in the automatic transmission.

The automatic transmission in this exemplary embodiment has five forward speeds. The gear stages of these five forward speeds have corresponding shift positions (for example, L range, 2nd range, 3rd range, 4th range, D range, N range, REV range and P range).

The ECT-ECU 100 according to the exemplary embodiment determines whether the transmission state is on the abruptly increasing the turbine speed side or the tie-up side based on input signals from the engine speed sensor 200 and the turbine speed sensor 300, and then executes one of either the tie-up learning control and the abrupt turbine speed increase learning control, whichever is appropriate. At this time, even if the condition for executing the tie-up learning control is satisfied, it will not be executed unless the number of trips after the latest execution of the abrupt turbine speed increase learning control is equal to, or greater than, a predetermined number.

Figure 2:
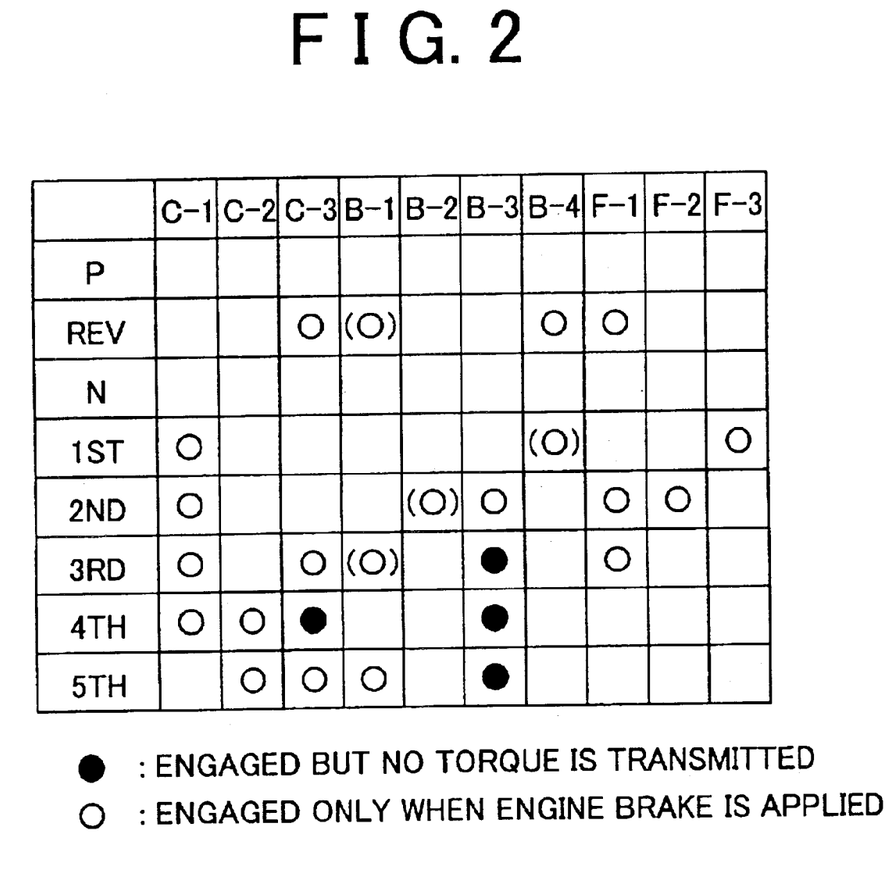
FIG. 2 is an engagement state chart showing each gear stage of the automatic transmission according to the embodiment of the invention.

An engagement state chart of the automatic transmission will now be explained with reference to FIG. 2. As shown in the figure, the engagement state chart shows whether a clutch and a brake, which are frictional engagement elements, are engaged or disengaged in each gear stage. In fourth speed, a clutch (C-1) and a clutch (C-2) are engaged, and a clutch (C-3) and a frictional engagement element for engine braking (B-3) are engaged but no torque is transmitted. In fifth speed, the clutch (C-2), the clutch (C-3), and a frictional engagement element for engine braking (B-1) are engaged, and the frictional engagement element for engine braking (B-3) is engaged but no torque is transmitted. Clutch-to-clutch shifting, which is the object of the learning control according to this invention, occurs when there is an upshift from fourth speed to fifth speed and when there is a downshift from fifth speed to fourth speed in the figure.

Figure 3:
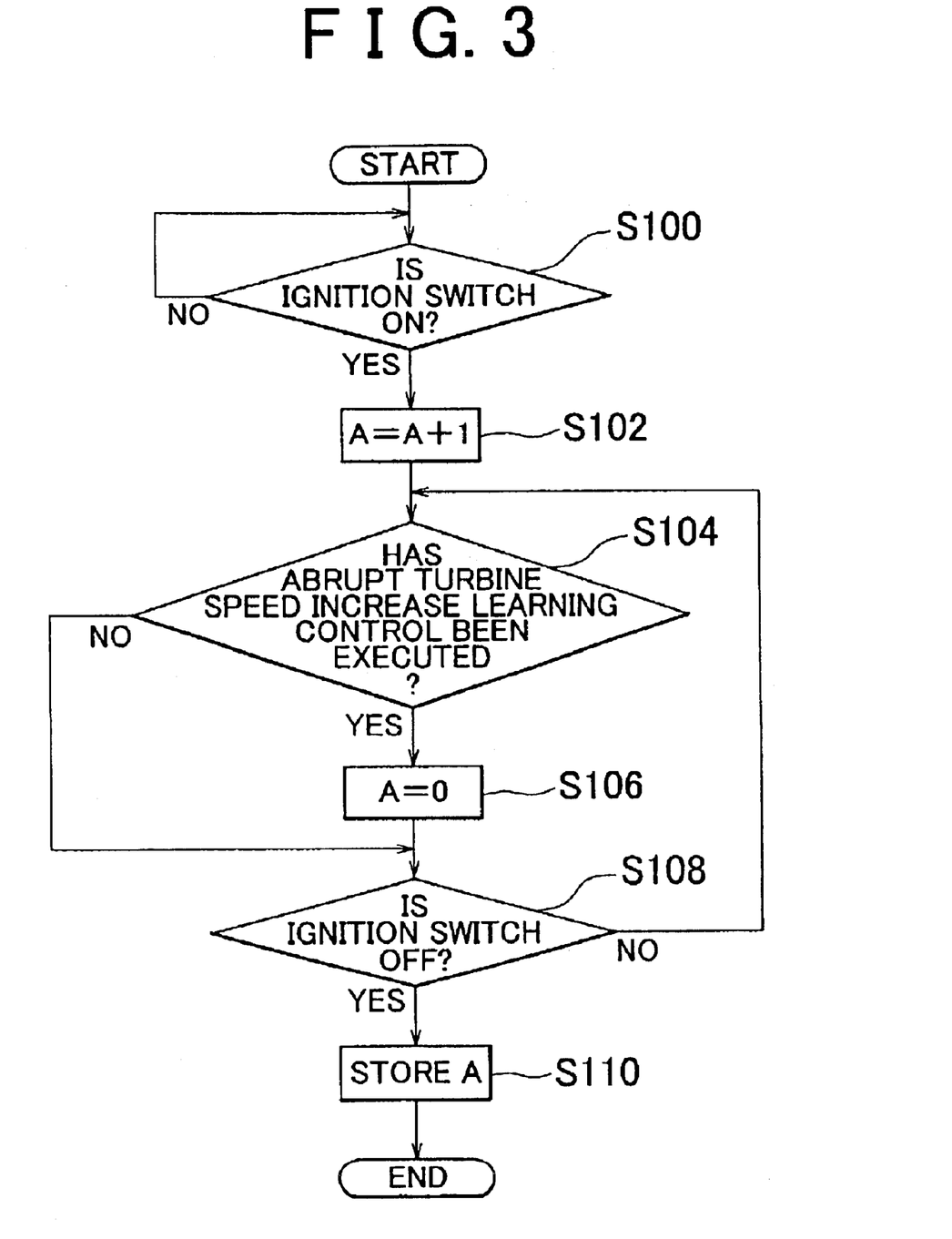
FIG. 3 is a first flowchart showing a control of a program executed by the control apparatus for an automatic transmission according to the embodiment of the invention.

The control of a program executed by the ECT-ECU 100 which realizes the control apparatus of the automatic transmission according to the exemplary embodiment of the invention will now be described with reference to FIG. 3.

In step S100, the ECT-ECU 100 determines whether the ignition switch has been turned on. This determination is based on a signal input to the ECT-ECU 100 from the ignition switch 600. If the ignition switch has been turned on (i.e., YES in step S100), the process proceeds on to step S102. If the ignition switch has not been turned on (i.e., NO in step S100), however, the process returns to step S100 and waits until the ignition switch is turned on.

In step S102, the ECT-ECU 100 substitutes A+1 for a variable A stored in the memory. In step S104, the ECT-ECU 100 determines whether the abrupt turbine speed increase learning control has been executed. If the abrupt turbine speed increase learning control has been executed (i.e., YES in step S104), the process proceeds on to step S106. If the abrupt turbine speed increase learning control has not been executed (i.e., NO in step S104), however, the process proceeds to step S108.

In step S106, the ECT-ECU 100 substitutes 0 for the variable A. In step S108, the ECT-ECU 100 determines whether the ignition switch has been turned off. If the ignition switch has been turned off (i.e., YES in step S108), the process proceeds on to step S110. If the ignition switch has not been turned off (i.e., NO in step S108), however, the process returns to step S104. In addition, the ECT-ECU 100 also determines whether the abrupt turbine speed increase learning control has been executed. In step S110, the ECT-ECU 100 stores the variable A in the memory.

Figure 4:
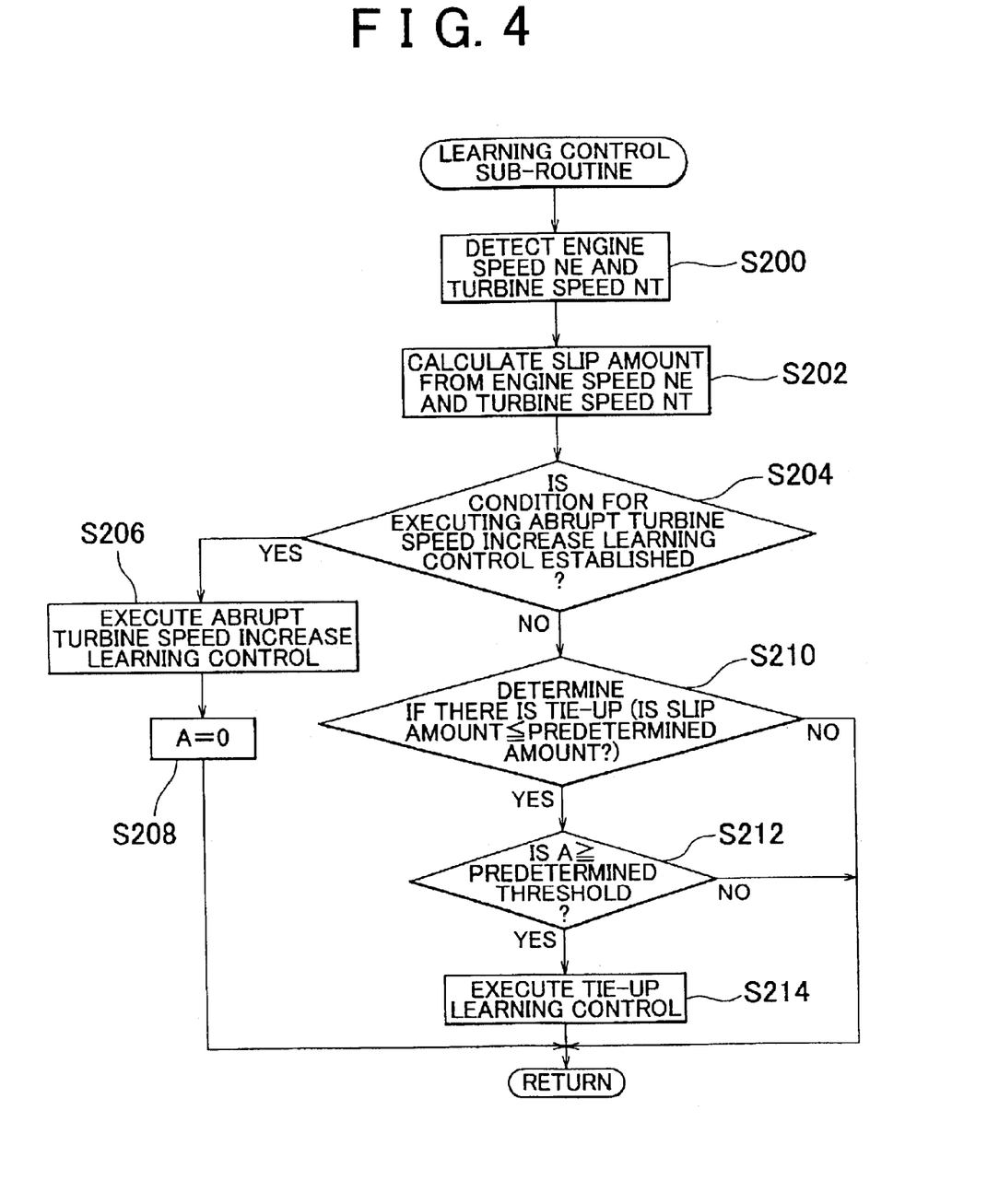
FIG. 4 is a second flowchart showing a control of another program executed by the control apparatus for an automatic transmission according to the embodiment of the invention.

The control of a program of a learning control sub-routine executed by the ECT-ECU 100 which realizes the control apparatus of the automatic transmission according to the exemplary embodiment of the invention will now be described with reference to FIG. 4. The learning control sub-routine shown in FIG. 4 is executed after a downshift, as well as after an upshift, by clutch-to-clutch shifting.

In step S200, the ECT-ECU 100 detects an engine speed NE and a turbine speed NT. The engine speed NE is detected based on a signal input to the ECT-ECU 100 from the engine speed sensor 200, and the turbine speed NT is detected based on a signal input to the ECT-ECU 100 from the turbine speed sensor 300. In step S202, the ECT-ECU 100 calculates a slip amount from the engine speed NE and the turbine speed NT. This slip amount may also be a slip rate.

In step S204, the ECT-ECU 100 determines whether a condition for executing the abrupt turbine speed increase learning control has been established. This determination is based on the calculated slip amount or the like. When it has been determined that the condition for executing the abrupt turbine speed increase learning control has been established (i.e., YES in step S204), the process proceeds on to step S206. When the condition for executing the abrupt turbine speed increase learning control has not been established (i.e., NO in step S204), however, the process proceeds to step S210.

In step S206, the ECT-ECU 100 executes the abrupt turbine speed increase learning control. In step S208, the ECT-ECU 100 substitutes 0 for the variable A, after which the sub-routine ends.

In step S210, the ECT-ECU 100 determines whether the transmission is in the tie-up state. This determination is made based on whether the slip amount is equal to, or less than, a predetermined amount. When it is determined that the transmission is in the tie-up state (i.e., YES in step S210), the process proceeds on to step S212. When it is determined that the transmission is not in the tie-up state (i.e., NO in step S210), however, the sub-routine ends.

In step S212, the ECT-ECU 100 determines whether the variable A is equal to, or greater than, a predetermined threshold value. When the variable A is equal to, or greater than, the predetermined threshold (i.e., YES in step S212), the process proceeds on to step S214. When the variable A is not equal to, or greater than, the predetermined threshold (i.e., NO in step S212), however, the sub-routine ends.

In step S214, the ECT-ECU 100 executes the tie-up learning control, after which the sub-routine ends.

Alternatively, with regard to the slip amount calculated in steps S200 and S202 shown in FIG. 4, the abrupt turbine speed increase determination or the tie-up determination may be made based on the change over time calculated from the turbine speed NT.

Hereinafter, operation of the ECT-ECU 100 which realizes the control apparatus for the automatic transmission according to the exemplary embodiment will be described based on the aforementioned configuration and flowcharts.

[Abrupt Turbine Speed Increase Learning Control and Tie-up Learning Control]

Figure 5:
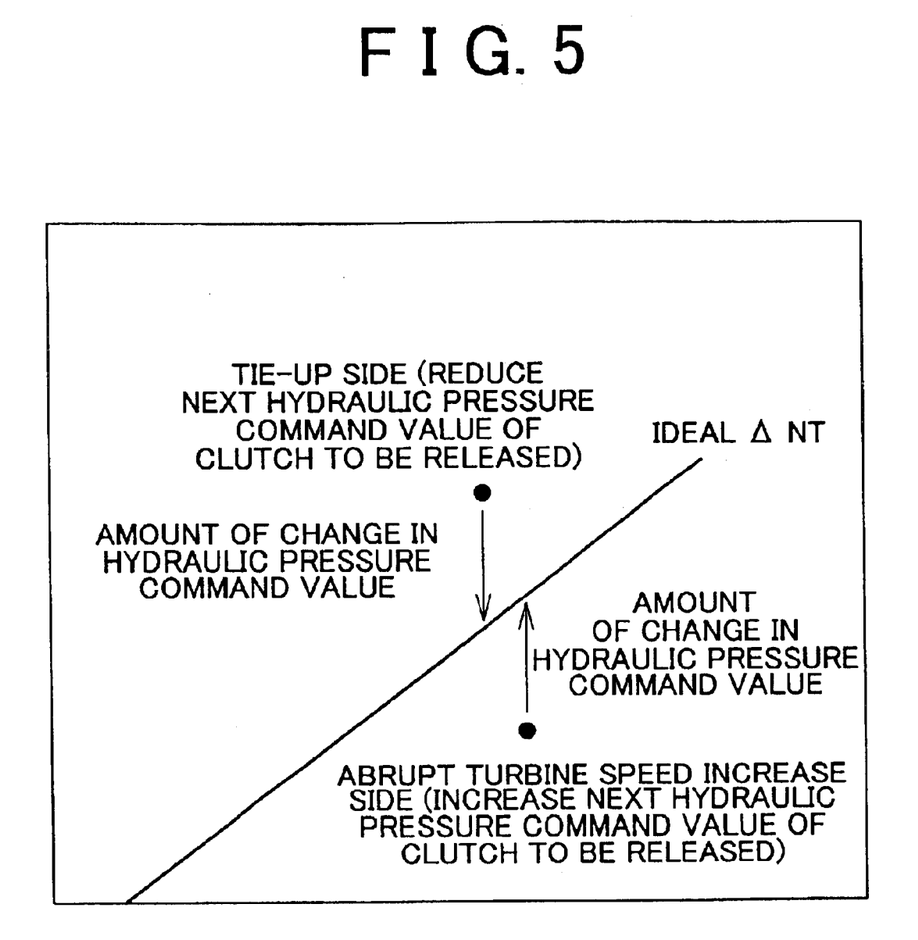
FIG. 5 is a graph for explaining tie-up learning control and abrupt turbine speed increase learning control.
Figure 6:
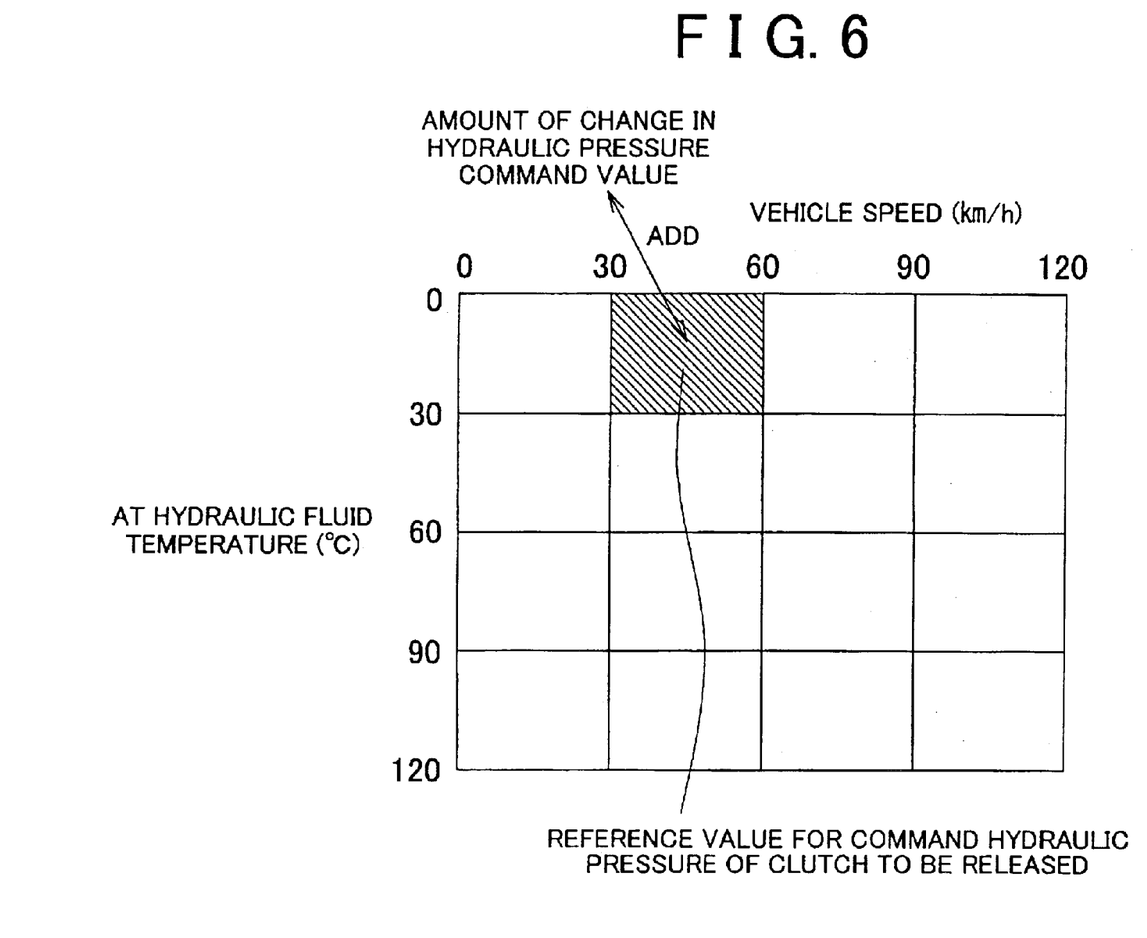
FIG. 6 is a graph showing a relationship between AT hydraulic fluid temperature and vehicle speed.

The abrupt turbine speed increase learning control and the tie-up learning control executed by the ECT-ECU 100 according to this exemplary embodiment will be described with reference to FIGS. 5 and 6. FIG. 5 shows the relationship between the amount of change in a hydraulic pressure command value and the change over time of the turbine speed. When the actual change over time of the turbine speed is above the ideal change over time of the turbine speed, it is determined that the transmission state is on the tie-up side so the abrupt turbine speed increase learning control is executed to lower the next hydraulic pressure command value of the clutch to be released. On the other hand, when the actual change over time of the turbine speed is below the ideal change over time of the turbine speed, it is determined that the transmission state is on the abrupt turbine speed increase side so the tie-up learning control is executed to raise the next hydraulic pressure command value of the clutch to be released. That is, regardless of whether the transmission state is on the tie-up side or the abrupt turbine speed increase side, the next hydraulic pressure command value can be changed so that the change over time of the actual turbine speed approaches the change over time of the ideal turbine speed.

A procedure for converting the amount of change of the hydraulic pressure command value shown in FIG. 5 into an actual command current value to be supplied to the AT linear solenoid 800 will now be described. FIG. 6 shows a reference value for the command hydraulic pressure of the clutch to be released that was stored in each region in a matrix of the relationship between the AT hydraulic fluid temperature and the vehicle speed. When the amount of change in the hydraulic pressure command value is calculated as was described using FIG. 5, the corresponding region is selected based on the matrix shown in FIG. 6, the vehicle speed input from the vehicle speed sensor 400, and the AT hydraulic fluid temperature input from the AT hydraulic fluid temperature sensor 500. The sum of the amount of change in the hydraulic pressure command value and the reference value of the command hydraulic pressure of the clutch to be released stored in the corresponding region is then output to the AT linear solenoid 800 as the next hydraulic pressure command value of the clutch to be released.

[Trip Operation]

When the ignition switch is turned on (i.e., YES in step S100), 1 is added to the variable A (step S102). If the ignition switch is turned off (i.e., YES in step S108) when the abrupt turbine speed increase learning control has not been executed while the vehicle is running (i.e., NO in step S104), the variable A is stored in the memory. When the abrupt turbine speed increase learning control is not executed, the variable A is indicative of the number of trips of the ignition switch having been turned from on to off.

On the other hand, when the abrupt turbine speed increase learning control is executed while the vehicle is running (i.e., YES in step S104), the variable A is initialized (i.e., A=0) (step S106). Therefore, the variable A is initialized if the abrupt turbine speed increase learning control has been executed at least once within the time from when the ignition switch is turned on until it is turned off. The variable A is then stored in the memory.

[Learning Control Operation]

After a downshift or an upshift is performed by clutch-to-clutch shifting action while the vehicle is running, the engine speed NE and the turbine speed NT are detected (step S200), and the slip amount is calculated (step S202). If the condition for executing the abrupt turbine speed increase learning control based on the slip amount or the like has not been established, (i.e., NO in step S204), a tie-up determination is made based on whether the slip amount is equal to, or less than, a predetermined amount (step S210). When it has been determined that there is tie-up (i.e., YES in step S210), tie-up learning control is executed (step S214) when the number of times the ignition has been turned from on to off (this number is initialized if the abrupt turbine speed increase learning control was executed during that time) is equal to, or greater than, a predetermined threshold (i.e., YES in step S212).

On the other hand, the tie-up learning control is not executed in step S214 when the number of times the ignition has been turned from on to off is less than the predetermined threshold (i.e., NO in step S212), even when it has been determined that there is tie-up (i.e., even when YES in step S210).

Figure 7:
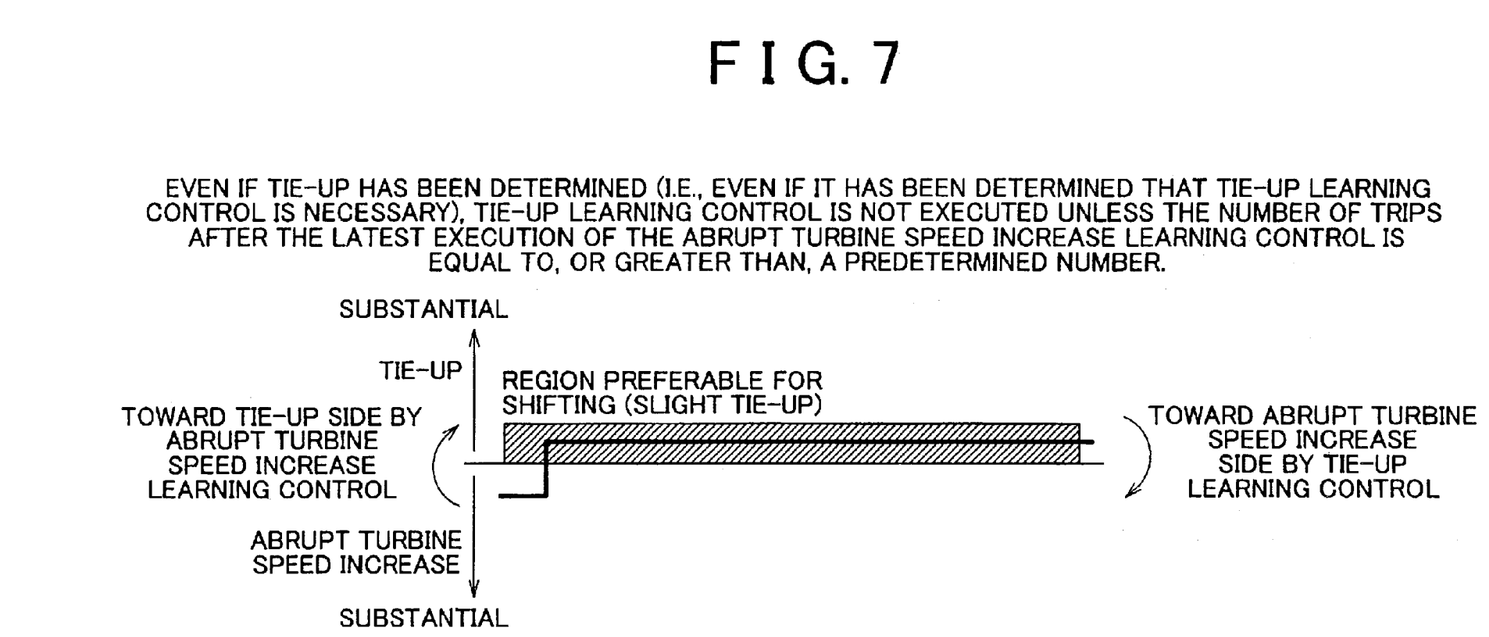
FIG. 7 is a first diagram illustrating a state in which the tie-up learning control and the abrupt turbine speed increase learning control are repeatedly executed.

The operation state at this time will now be described with reference to FIG. 7. Initially, when the transmission state is on the abrupt turbine speed increase side, it is shifted toward the tie-up side by the abrupt turbine speed increase learning control. In this state, the ignition switch is turned on and the vehicle is run, and then the vehicle is stopped and the ignition switch is turned off. This turning of the ignition switch from on to off is counted as one trip.

Even if it has been determined that there is tie-up, when the number of trips indicated by the variable A is less than the predetermined value, the tie-up learning control is not recognized and the transmission state is not shifted toward the abrupt turbine speed increase side. On the other hand, even if the transmission state has temporarily entered the region of slight tie-up by the abrupt turbine speed increase learning control, it is possible that the transmission state may come out of that region of slight tie-up due to a change in shifting characteristics or the like (there is an undeniable possibility that the transmission state may be shifting toward the region of substantial tie-up when the number of trips has increased such that the variable A is equal to, or greater than, the predetermined value). At this time, the tie-up learning control is recognized and the transmission state is shifted toward the abrupt turbine speed increase side. Then, when it has been determined that the transmission state is on the abrupt turbine speed increase side, the transmission state is shifted toward the tie-up side by the abrupt turbine speed increase learning control.

As a result, even if tie-up has been determined before the predetermined number, or more, of trips has been reached (i.e., even if it has been determined that the tie-up learning control is necessary), the tie-up learning control is not recognized, so hunting will not occur.

With the control apparatus for an automatic transmission according to the exemplary embodiment, the number of trips of the ignition switch being turned from on to off is counted. At this time, the count is initialized when the abrupt turbine speed increase learning control is executed. When the slip amount has been calculated from the engine speed and the turbine speed and tie-up has been determined, the tie-up learning control is executed if the number of trips is equal to, or greater than, the predetermined value. If the number of trips is less than the predetermined value, and the transmission state is determined to be in the region of slight tie-up, which is a region preferable for shifting, so to keep the transmission in this state, the tie-up learning control is not executed. As a result, even if both the tie-up learning control and the abrupt turbine speed increase learning control are used, those learning controls are not repeatedly executed, so a situation in which there is hunting in the control operation is able to be avoided.

It should be noted that this invention is not limited to the number of trips described in the exemplary embodiment. The invention can be applied as long as there is a physical value that indicates repetition of vehicle running, even if it is something other than the number of trips.

While the invention has been described with reference to preferred embodiments thereof, it is to be understood that the invention is not limited to the preferred embodiments or constructions. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control apparatus for an automatic transmission that executes a shift by simultaneously controlling release and engagement of different frictional engagement elements, the control apparatus comprising:

first hydraulic pressure learning controlling means for executing a first learning control to change a hydraulic pressure control of at least one of a frictional engagement element to be released and a frictional engagement element to be engaged so as to avoid a situation in which both of the frictional engagement elements are in a state of release at the same time;

second hydraulic pressure learning controlling means for executing a second learning control to change the hydraulic pressure control of at least one of the frictional engagement element to be released and the frictional engagement element to be engaged so as to avoid a situation in which both of the frictional engagement elements are in a state of engagement at the same time;

detecting means for detecting a turbine speed;

determining means for determining whether one of the first learning control and the second learning control should be executed based on the detected turbine speed;

storing means for storing a history of execution of at least one of the learning controls; and controlling means for controlling the first hydraulic pressure learning controlling means and the second hydraulic pressure learning controlling means such that the learning control determined by the determining means is executed when the history of one of the first and second learning control, which is stored in the storing means, and which is different from the learning control determined by the determining means, fulfills a predetermined condition.

2. The control apparatus according to claim 1, wherein the determining means includes means for determining whether one of the first learning control and the second learning control should be executed based on a change over time in the detected turbine speed.

3. The control apparatus according to claim 1, wherein the frictional engagement elements include a clutch and a brake of the automatic transmission.

4. The control apparatus according to claim 1, wherein:
the first hydraulic pressure learning controlling means executes an abrupt turbine speed increase learning control to shift the transmission toward the tie-up side by executing a learning control to change a hydraulic pressure control of the frictional engagement element so as to avoid a situation in which the transmission is in the abrupt turbine speed increase state; and
the second hydraulic pressure learning controlling means executes tie-up learning control to shift the transmission to the abrupt turbine speed increase side by executing a learning control to change the hydraulic pressure control of the frictional engagement element so as to avoid a situation in which the transmission is in the tie-up state.

5. The control apparatus according to claim 1, wherein:
the first hydraulic pressure learning controlling means includes means for executing one of a learning control to delay the hydraulic pressure control of the frictional engagement element to be released and a learning control to speed up the hydraulic pressure control of the frictional engagement element to be engaged; and
the second hydraulic pressure learning controlling means includes means for executing one of a learning control to speed up the hydraulic pressure control of the frictional engagement element to be released and a learning control to delay the hydraulic pressure control of the frictional engagement element to be engaged.

6. The control apparatus according to claim 1, wherein the controlling means includes means for controlling the second hydraulic pressure learning controlling means to execute the second learning control when the number of trips of an ignition switch being turned from on to off is equal to, or greater than, a predetermined number of times after the latest execution of the first learning means, and the determining means determines that the second learning control should be executed.

7. The control apparatus according to claim 1, wherein:
the control apparatus further includes means for detecting an engine speed; and
the determining means includes means for determining whether one of the first learning control and the second learning control should be executed based on the detected turbine speed and engine speed.

8. The control apparatus according to claim 7, wherein the determining means determines whether one of the first learning control and the second learning control should be executed based on a slip amount calculated from the detected engine speed and the turbine speed.

9. A control method for an automatic transmission that executes a shift by simultaneously controlling release and engagement of different frictional engagement elements, the control method comprising:
a first hydraulic pressure learning control step of executing a first learning control to change a hydraulic pressure control of at least one of a frictional engagement element to be released and a frictional engagement element to be engaged so as to avoid a situation in which both of the frictional engagement elements are in a state of release at the same time;
a second hydraulic pressure learning control step of executing a second learning control to change the hydraulic pressure control of at least one of the frictional engagement element to be released and the frictional engagement element to be engaged so as to avoid a situation in which both of the frictional engagement elements are in a state of engagement at the same time;
a detection step of detecting a turbine speed;
a determination step of determining whether one of the first learning control and the second learning control should be executed based on the detected turbine speed;
a storage step of storing a history of execution of at least one of the learning controls; and
a control step of controlling the first hydraulic pressure learning controlling means and the second hydraulic pressure learning controlling means such that the learning control determined in the determination step is executed when the stored history of one of the first and second learning control which is different from the learning control determined by the determining means fulfills a predetermined condition.

10. The control method according to claim 9, wherein the determination step includes a step of determining whether one of the first learning control and the second learning control should be executed based on a change over time in the detected turbine speed.

11. The control method according to claim 9, wherein:
the first hydraulic pressure learning control step includes a step of executing one of a learning control to delay the hydraulic pressure control of the frictional engagement element to be released and a learning control to speed up the hydraulic pressure control of the frictional engagement element to be engaged; and
the second hydraulic pressure learning control step includes a step of executing one of a learning control to speed up the hydraulic pressure control of the frictional engagement element to be released and a learning control to delay the hydraulic pressure control of the frictional engagement element to be engaged.

12. The control method according to claim 9, wherein the control step includes a step of controlling the second hydraulic pressure learning controlling means to execute the second learning control when the number of trips of an ignition switch being turned from on to off is equal to, or greater than, a predetermined number of times after the latest execution of the first learning means, and it is determined in the determination step that the second learning control should be executed.

13. The control method according to claim 9, wherein:
the first hydraulic pressure learning control step executes an abrupt turbine speed increase learning control to shift the transmission toward the tie-up side by executing a learning control to change a hydraulic pressure control of the frictional engagement element so as to avoid a situation in which the transmission is in the abrupt turbine speed increase state; and
the second hydraulic pressure learning control step executes tie-up learning control to shift the transmission to the abrupt turbine speed increase side by executing a learning control to change the hydraulic pressure control of the frictional engagement element so as to avoid a situation in which the transmission is in the tie-up state.

14. The control method according to claim 9, wherein:
the control step further includes a step of detecting an engine speed; and
the determination step includes a step of determining whether one of the first learning control and the second learning control should be executed based on the detected turbine speed and engine speed.

15. The control method according to claim 14, wherein the determination step determines whether one of the first learning control and the second learning control should be executed based on a slip amount calculated from the detected engine speed and the turbine speed.

16. A control apparatus for an automatic transmission, comprising:
- a frictional engagement element to be released;
- a frictional engagement element to be engaged;
- a detector that detects a turbine speed; and
- a controller that executes: a first learning control to change a hydraulic pressure control of at least one of the frictional engagement element to be released and the frictional engagement element to be engaged so as to avoid a situation in which both of the frictional engagement elements are in a state of release at the same time; and
- a second learning control to change the hydraulic pressure control of at least one of the frictional engagement element to be released and the frictional engagement element to be engaged so as to avoid a situation in which both of the frictional engagement elements are in a state of engagement at the same time, wherein the controller determines whether one of the first learning control and the second learning control should be executed based on the detected turbine speed, wherein the controller stores a history of execution of at least one of the learning controls, and wherein the controller controls the first hydraulic pressure learning control and the second hydraulic pressure learning control such that the learning control determined by the controller is executed when the history of one of the first and second learning control, which is stored in the controller and which is different from the learning control determined by the controller fulfills a predetermined condition.

* * * * *